Sept. 23, 1969   J. L. A. DURET   3,468,563
SEPARABLE JOINT FOR PIPES

Filed Aug. 7, 1967   3 Sheets-Sheet 1

Sept. 23, 1969 J. L. A. DURET 3,468,563
SEPARABLE JOINT FOR PIPES
Filed Aug. 7, 1967 3 Sheets-Sheet 2
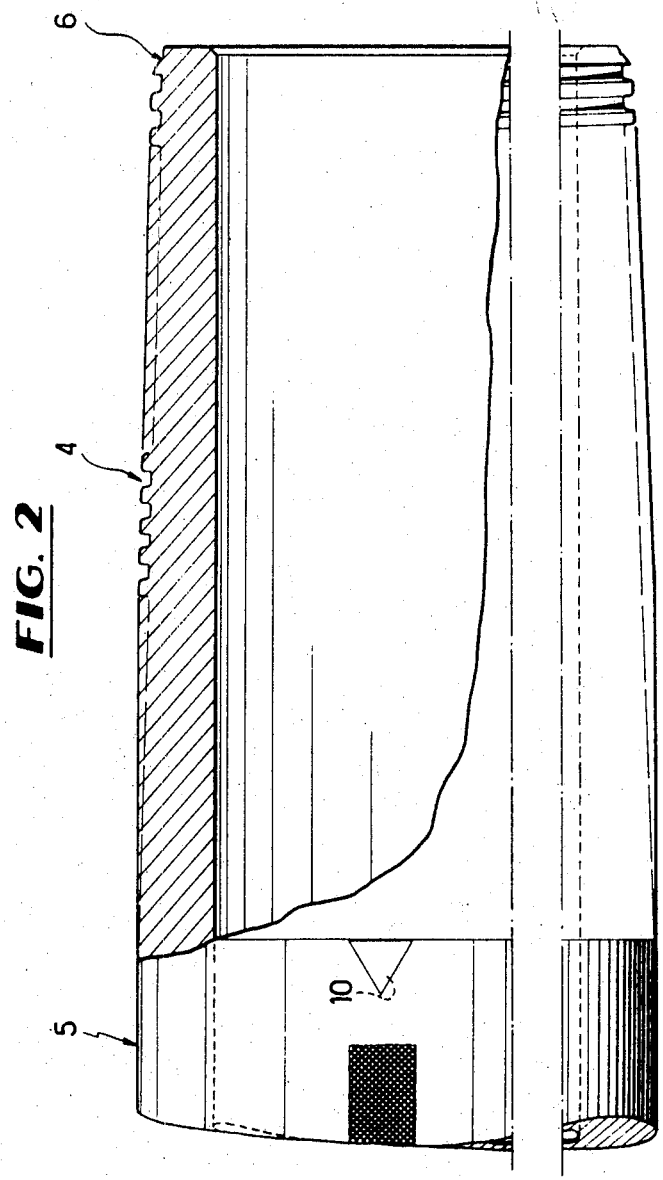

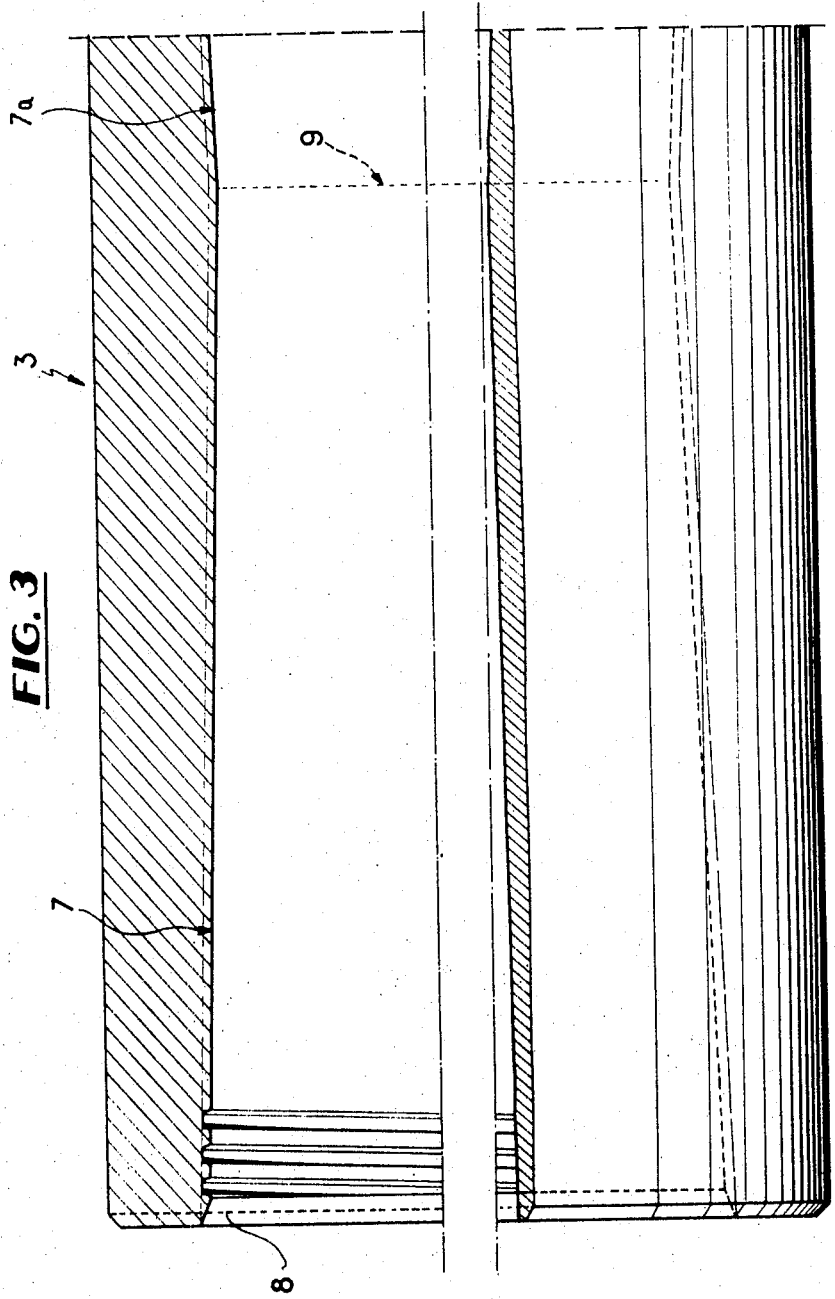

United States Patent Office 3,468,563
Patented Sept. 23, 1969

3,468,563
SEPARABLE JOINT FOR PIPES
Jean Louis Albert Duret, Aulnoye-Aymeries, France, assignor to Société Anonyme dite: Vallourec, Paris, France
Filed Aug. 7, 1967, Ser. No. 658,894
Claims priority, application Luxembourg, Aug. 10, 1966, 51,742
Int. Cl. F16l 55/00, 35/00
U.S. Cl. 285—93       9 Claims

ABSTRACT OF THE DISCLOSURE

Separable pipe joints in which the manufacturing tolerances for the crests of the threads are distributed to fall half above and half below a predetermined optimum and the threads are permitted to be thinner but no thicker than a predetermined optimum.

---

Separable pipe joints characterized by the fact the male and female members are provided with mating threads carried by frusto-conical surfaces are well known in the petroleum industry.

In this type of joint increased friction between the male and female members results as the male member is screwed into the female member, and a shoulder, which may be positioned at the base of the threads on the male portion acts as a stop to limit the extent to which the male member can be inserted into the female member.

Moreover, when the joints are to be made fluid tight, this object is achieved by providing sealing contact between two conical seats positioned at the base of the female threads and near the end of the male member.

Joints of this type remain satisfactorily fluid-tight even after being repeatedly taken apart and put together again.

It is, however, necessary to machine such joints to close tolerances, and since they are relatively complex, this tends to so greatly increase their cost as to render them quite expensive.

The present invention relates to a new type of joint which is easier and less expensive to make and which nevertheless makes up into a satisfactorily fluid-tight joint, even after having been repeatedly taken apart and put together.

It is the object of the present invention to provide a separable joint for pipes and particularly for pipes to be used in drilling oil wells, said joint being of the type comprising two male members, each carrying at one end a set of trapezoidal threads formed on a frusto-conical surface, which are assembled by means of a tubular female sleeve provided at each end with threads mating with those on the male members. This joint has the following characteristics.

(1) The manufacturing tolerances of the threads are such that:

(a) The differences between the actual heights of the threads on the male and female members and their theoretical heights are statistically distributed in equal numbers on opposite sides of the the theoretrical value of the heights of the threads, and (b) Despite the manufacturing tolerances, the flanks of the threads which grip the male member within the female member are either in the position which they should theoretically occupy or short thereof, that is to say, the threads are thinner than they should theoretically be.

(2) The angle of inclination of the lateral faces of the threads is such that, after allowing for the maximum cumulative systematic error in the pitch of the threads, over the entire length of the threads, the engagement of the threads of the male member in those of the female member is in any case ensured.

As will be seen, the joint according to the present invention does not require the presence of any limiting shoulder or any other particular fluid-proofing means. Moreover, it is extremely simple to machine the male and female members because it is only necessary to cut trapezoidal threads on the frusto-conical end portions of the sleeve or of the pipes without having to machine any connecting portion between the threaded part of the male member and the unthreaded part thereof.

Despite the simplicity of manufacture, the joint according to the invention gives good results in practice, and is rendered fluid-tight by the elastic and possibly plastic deformations of the different parts of the threads due to the special characteristics which have been set forth above.

In one embodiment of the invention, the surfaces of the threaded parts of the joint may be hardened by treatment with zinc or with phosphorus, for example.

Such hard coatings may act as anti-friction surfaces while at the same time resisting deformation and helping to precisely position the two members of the joint so as to produce a specific amount of friction and require an exactly predetermined torque for assembly, which would not be the case if the coatings were thick and deformable, as is the case in certain prior art joints.

In a preferred, but by no means the only possible embodiment of the joint according to the invention, the fact that the joint is properly made up is indicated by two marks which are then in axial alignment, one of said marks being carried by the male member and the other by the female member.

In view of the characteristics of the joint according to the invention the simple alignment of these two marks suffices to insure that the joint has been properly made up, by applying the proper torque.

According to another embodiment of the invention, the sleeve is attached, preferably at the factory, to one of the male members, which then acts as if it were a female member. This embodiment offers the advantage that, when in use on the job, it is easy to tell which pipe will come out of the sleeve first.

Finally, in yet another embodiment of the invention, the threads may be covered by a film of polytetrafluoroethylene, for example, which while lubricating the threads, also renders the joint more fluid-tight, if this is necessary.

The joints according to the invention have given complete satisfaction in practice. In fact, even when repeatedly taken apart and put together, with random substitution of the different members, the fluid-tightness of the joint has not been adversely affected.

In order that the invention may be better understood, one embodiment of the invention will now be described, purely by way of illustration, and with reference to the accompanying drawing, in which:

FIG. 2 is a view showing one of the male members of the joint of FIG. 1, partially in longitudinal section, on an enlarged scale;

FIG. 3 is a view showing the left end of the sleeve of the joint of FIG. 1, partially in section, on an enlarged scale.

Figure 1:
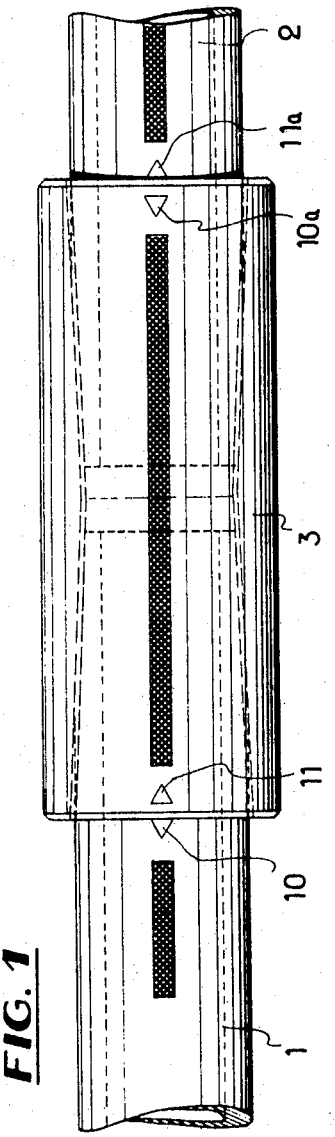
FIG. 1 is a plan view of a joint according to the invention.

It will be seen from FIG. 1 that, in accordance with the invention, the pipe 1 is connected to the pipe 2 by a sleeve 3.

As shown in broken lines on FIG. 1 and in solid lines on FIGS. 2 and 3, the end of each pipe 1, 2, carries threads 4 which are trapezoidal in section, and lie on a frusto-conical surface.

In a preferred embodiment of the invention the threaded section 4 runs directly into the outer surface 5 of the pipe, so that it is unnecessary to machine a transition section between the threads 4 and the surface 5.

It is only necessary to provide a small chamfer 6 at the ends of pipes 1 and to facilitate their insertion into the sleeve.

The sleeve is in like manner provided with two sets of threads 7 and 7a, which are trapezoidal in section and formed on a frusto-conical surface within the sleeve 3. A chamfer 8 is also provided at the two ends of the threads in the sleeve 3 so as to facilitate the assembly of the joint.

The junction of these two frusto-conical threaded sections at the plane 9 of the sleeve may be made without taking any special precautions as to exact tolerances, since the threads in this part of the sleeve do not engage those on the male members.

FIG. 1 shows how the indicia 10, 11, and 10a, 11a make it easy to ensure that the joint is properly assembled.

Because of the characteristics of the joints according to the invention, it is correctly screwed together when the indicia 10 and 11 or 10a and 11a are in longitudinal alignment.

The indicia may be applied in a very simple manner by cutting them into the cold metal of the pipe or in any other way, such for instance, as by painting. As shown in FIG. 1 the position of the indicia is located quite easily while checking that the threads have been properly machined in a conventional manner, by means of a gauge. In the present case the gauge itself carries a mark which is used to determine the position of the indicia on the pipe or sleeve, after taking into account the degree of tightness desired.

Figure 4:
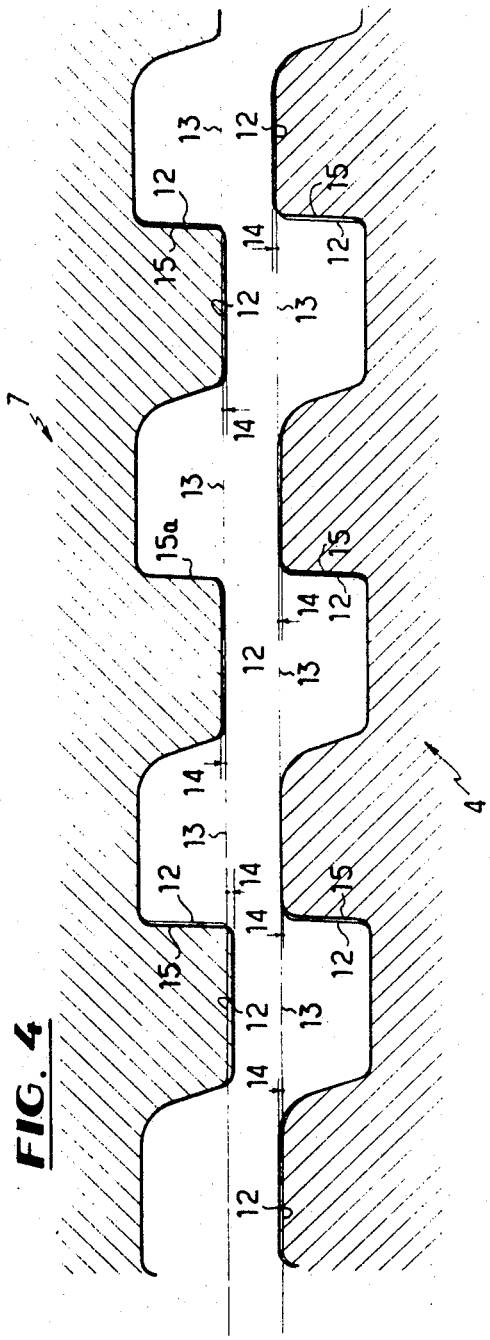
FIG. 4 is an axial sectional view on a still larger scale, showing how the manufacturing tolerances of the threads are distributed over the male and female members of the joint according to the invention.

FIG. 4 shows how the tolerances allowed during manufacture of the threads must be distributed to produce a joint according to the invention.

This figure shows on an enlarged scale part of the male thread 4 and a part of the female thread 7 which correspond, for example to those shown on FIGURES 2 and 3.

The thin line 12 indicates the theoretical envelope in which the profile of the threads would lie if it were possible to machine these threads perfectly.

This thin line is shown on FIG. 4 wherever it would not be superposed on the actual contour of the threads and is necessary to facilitate an understanding of the invention.

FIG. 4 also shows the lines 13 which define the position 5 which would be occupied by the crests of the threads if these had been perfectly machined.

The arrows 14 point to the discrepancy between the ideal line which should be occupied by the crests of the threads and the actual position of said crests.

It will be noted that on the drawing these discrepancies are found positioned on opposite sides of the ideal lines 13 so that the manufacturing tolerances are statistically distributed in equal numbers on both sides of the theoretical lines.

It will also be noted on FIG. 4 that in accordance with the invention the flanks 15 of the threads are always actually inside the line 12 which corresponds to the theoretically desired profile of the teeth, except for the flank 15a which has been shown with a zero error, so that actual position of this flank corresponds exactly to the theoretical line 12.

Since in accordance with the invention, the manufacturing tolerances are always on the same side of the line 12 as the threads, there is always a certain amount of play between the male and female threads.

Finally, according to another characteristic feature of the invention, the inclination of the flanks of the threads 15 is such that even when a systematic error in pitch is cumulated over the length of the threads, it is nevertheless possible to engage all the threads on the male member into the lands between the threads of the female member.

What is claimed is:
1. In a separable pipe joint comprising at least one tubular male member and one tubular female member in screw threaded sealing engagement, the male member being provided at one end with a set of external trapezoidal threads formed in a frusto-conical surface and the female member being formed at one end with a mating set of internal trapezoidal threads formed on a frusto-conical surface, the improvement according to which the crests of approximately half the turns of the threads on each member slightly exceed but do not fall short of the theoretically optimum height for such threads while the remaining turns fall slightly short of, but do not exceed said optimum height.

2. A joint as claimed in claim 1 in which the thickness of said threads is slightly less than the width of the lands between said threads.

3. A joint as claimed in claim 2 in which the flanks of said threads so slope as to permit interengagement of the male and female threads despite maximum cumulative effect of an error in the pitch of the threads falling within a predetermined manufacturing tolerance.

4. A pipe joint as claimed in claim 1 wherein said tubular female member is provided with threads at both ends, and a tubular male member is connected at each end of said female member.

5. A joint as claimed in claim 4 in which said female member is permanently secured to one of said male members.

6. A joint as claimed in claim 1 in which the threaded parts of the male portion lead directly into the external surfaces thereof.

7. A joint as claimed in claim 1 in which the male and female members carry external indicia which, when brought into longitudinal alignment, indicate that the joint is properly made up.

8. A joint as claimed in claim 1 in which the threads are provided with an antifriction coating.

9. A joint as claimed in claim 1 in which at least one of said sets of threads is covered with a film of polytetrafluoroethylene.

References Cited
UNITED STATES PATENTS

| 1,932,427 | 10/1933 | Stone | 287—125 X |
|---|---|---|---|
| 1,953,701 | 3/1934 | Clark et al. | 285—93 |
| 2,211,173 | 8/1940 | Shaffer | 285—334 X |
| 2,587,544 | 2/1952 | Sneddon | 285—333 |
| 2,772,102 | 11/1956 | Webb | 285—334 |
| 3,081,644 | 3/1963 | Hudgens et al. | 85—46 |
| 3,100,656 | 8/1963 | MacArthur | 285—333 X |
| 3,180,202 | 4/1965 | Kahn | 85—46 |

DAVID J. WILLIAMOWSKY, Primary Examiner

DAVE W. AROLA, Assistant Examiner

U.S. Cl. X.R.

85—1, 46; 285—94, 334, 355, 369